United States Patent
Mashima

(10) Patent No.: US 11,069,374 B2
(45) Date of Patent: Jul. 20, 2021

(54) METHOD OF RESTORING SUSPENSION OF HARD DISK DRIVE

(71) Applicant: NHK SPRING CO., LTD., Yokohama (JP)

(72) Inventor: Akio Mashima, Aiko-gun (JP)

(73) Assignee: NHK SPRING CO., LTD., Kanagawa (JP)

( * ) Notice: Subject to any disclaimer, the term of this patent is extended or adjusted under 35 U.S.C. 154(b) by 508 days.

(21) Appl. No.: 15/975,015

(22) Filed: May 9, 2018

(65) Prior Publication Data
US 2018/0330749 A1  Nov. 15, 2018

(30) Foreign Application Priority Data
May 12, 2017  (JP) .............................. JP2017-095445

(51) Int. Cl.
*G11B 5/48*  (2006.01)
*G11B 5/187*  (2006.01)
(Continued)

(52) U.S. Cl.
CPC .......... *G11B 5/4826* (2013.01); *G11B 5/1272* (2013.01); *G11B 5/1871* (2013.01);
(Continued)

(58) Field of Classification Search
CPC ... G11B 5/4826; G11B 5/1272; G11B 5/1871; G11B 5/255; G11B 5/41;
(Continued)

(56) References Cited

U.S. PATENT DOCUMENTS

| 5,423,931 A * | 6/1995 | Inoue ................. H05K 13/0486 156/94 |
| 6,829,818 B2 * | 12/2004 | Kamigama .......... G11B 5/4826 228/175 |
| 8,752,278 B2 | 6/2014 | Inoue et al. |

(Continued)

FOREIGN PATENT DOCUMENTS

| CN | 1085012 A | 4/1994 |
| CN | 1695875 A | 11/2005 |

(Continued)

OTHER PUBLICATIONS

Chinese Office Action dated Sep. 4, 2019 (and English translation thereof) issued in Chinese Application No. 201810421068.5.

(Continued)

*Primary Examiner* — Peter Dungba Vo
*Assistant Examiner* — Azm A Parvez
(74) *Attorney, Agent, or Firm* — Holtz, Holtz & Volek PC

(57) ABSTRACT

A method of restoring a suspension of a hard disk drive includes detaching a slider, which is mounted on a tongue portion of the suspension via an adhesive, from the suspension, measuring a thickness of the adhesive in a cleaning area of the tongue portion, specifying a first residual area in which the thickness of the adhesive exceeds a threshold value, irradiating a first irradiation area including the first residual area locally with a first laser beam, and irradiating the cleaning area entirely with a second laser beam.

10 Claims, 6 Drawing Sheets

(51) Int. Cl.
  *G11B 5/127* (2006.01)
  *G11B 5/41* (2006.01)
  *G11B 5/255* (2006.01)

(52) U.S. Cl.
  CPC ............... *G11B 5/255* (2013.01); *G11B 5/41* (2013.01); *Y10T 29/49041* (2015.01)

(58) Field of Classification Search
  CPC ......... Y10T 29/49041; Y10T 29/49023; Y10T 29/49021; Y10T 29/49002
  USPC ... 29/603.12, 603.09, 603.07, 603.01, 602.1, 29/592.1
  See application file for complete search history.

(56) References Cited

U.S. PATENT DOCUMENTS

| | | |
|---|---|---|
| 9,070,418 B2 | 6/2015 | Kawao et al. |
| 9,570,326 B2 | 2/2017 | Uemura et al. |
| 2009/0159095 A1 | 6/2009 | Gomez et al. |
| 2015/0194301 A1 | 7/2015 | Uemura et al. |
| 2018/0290182 A1 | 10/2018 | Park et al. |

FOREIGN PATENT DOCUMENTS

| | | | |
|---|---|---|---|
| CN | 101462108 A | | 6/2009 |
| CN | 105772447 A | | 7/2016 |
| CN | 106001928 A | * | 10/2016 |
| CN | 106001928 A | | 10/2016 |
| JP | H01144638 A | | 6/1989 |
| JP | H04356384 A | | 12/1992 |
| JP | H0677264 A | | 3/1994 |
| JP | H09161931 A | | 6/1997 |
| JP | 2002093092 A | | 3/2002 |
| JP | 2005044399 A | | 2/2005 |
| JP | 2009295257 A | | 12/2009 |
| JP | 2011028813 A | | 2/2011 |
| JP | 2015223771 A | | 12/2015 |
| KR | 1020170028834 A | | 3/2017 |

OTHER PUBLICATIONS

Japanese Office Action dated Dec. 1, 2020 (and English translation thereof) issued in Japanese Application No. 2017-095445.

* cited by examiner

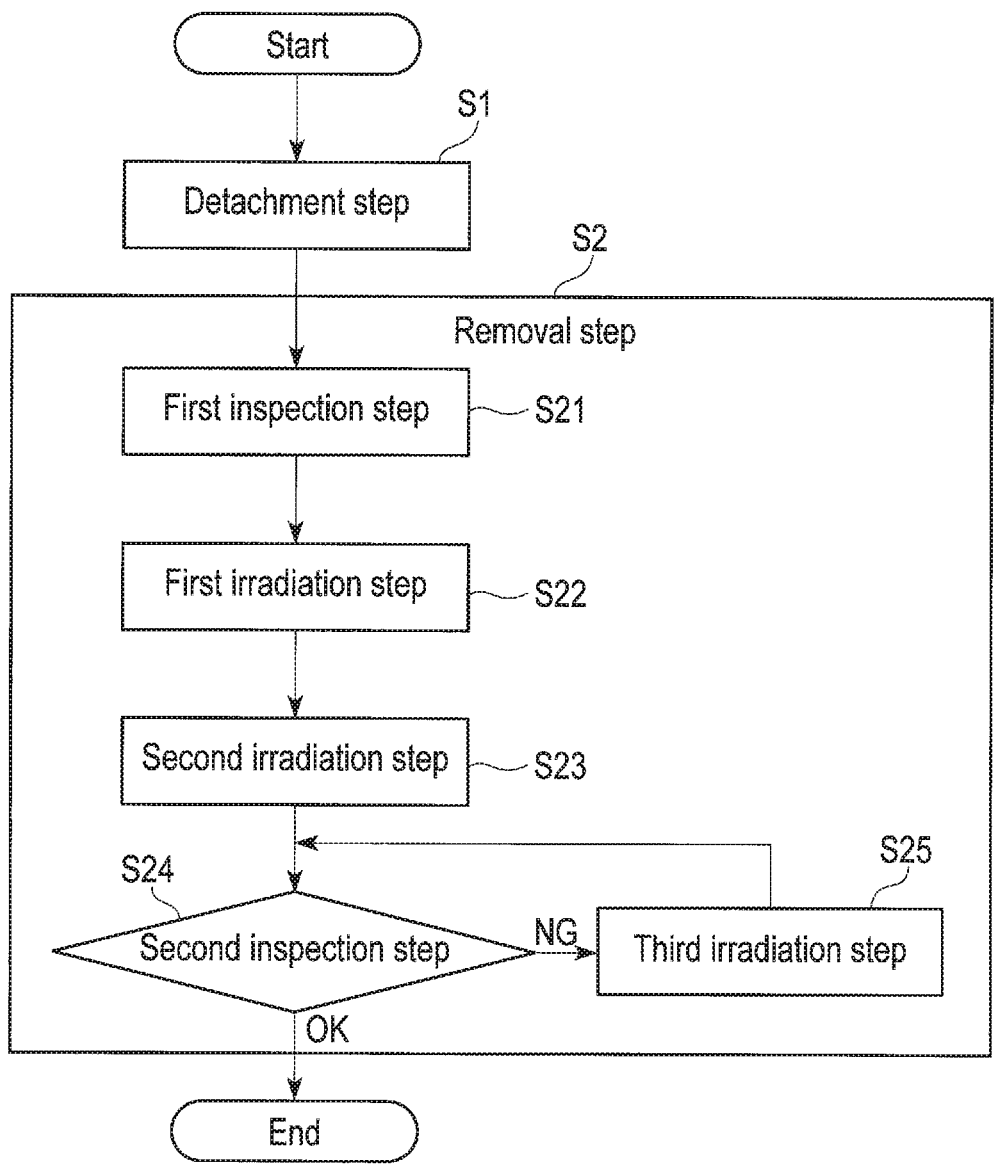
F I G. 1

METHOD OF RESTORING SUSPENSION OF HARD DISK DRIVE

CROSS-REFERENCE TO RELATED APPLICATIONS

This application is based upon and claims the benefit of priority from prior Japanese Patent Application No. 2017-095445, filed May 12, 2017, the entire contents of which are incorporated herein by reference.

BACKGROUND OF THE INVENTION

1. Field of the Invention

The present invention relates to a method of restoring a suspension of a hard disk drive.

2. Description of the Related Art

A head gimbal assembly of a hard disk drive is constituted of, for example, a magnetic head formed on a slider, and a suspension which elastically supports the slider. The completed head gimbal assembly is inspected whether or not it has the desired electrical characteristics, and only the head gimbal assembly having good characteristics is mounted on the hard disk drive.

If the electrical characteristics are below the standard, a slider whose characteristics are defective is detached from the head gimbal assembly, and is replaced with a new slider. At this time, an adhesive used to fix the slider may remain on the suspension. Conventionally, the suspension has been restored by mechanically scraping off the residual adhesive after swelling it with an organic solvent (for example, refer to JP 2009-295257 A, JP 2002-93092 A, and JP 2005-44399 A).

However, with the restoration method disclosed in the above literatures, since force is applied externally even though it is small, a delicate suspension may be deformed. Since precise work is required, reducing the working time is difficult. Further, even after the cleaning, the adhesive may be remaining on the suspension, and the removed adhesive may adhere to the suspension again. In terms of the environmental burden and the health of the operator, using the organic solvent is not preferable.

BRIEF SUMMARY OF THE INVENTION

An object of the present invention is to provide a method of restoring a suspension whereby an adhesive remaining at the place of a detached slider can be removed without damaging the suspension.

A method of restoring a suspension according to one embodiment includes detaching a slider, which is mounted on a tongue portion of a suspension of a hard disk drive via an adhesive, from the suspension, measuring a thickness of the adhesive in a cleaning area of the tongue portion, specifying a first residual area in which the thickness of the adhesive exceeds a threshold value, irradiating a first irradiation area including the first residual area locally with a first laser beam, and irradiating the cleaning area entirely with a second laser beam.

According to such a structure, the adhesive remaining at the place of the detached slider can be removed without damaging the suspension.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an illustration showing an example of a process included in a restoration method of the present embodiment.

DETAILED DESCRIPTION OF THE INVENTION

Figure 2:
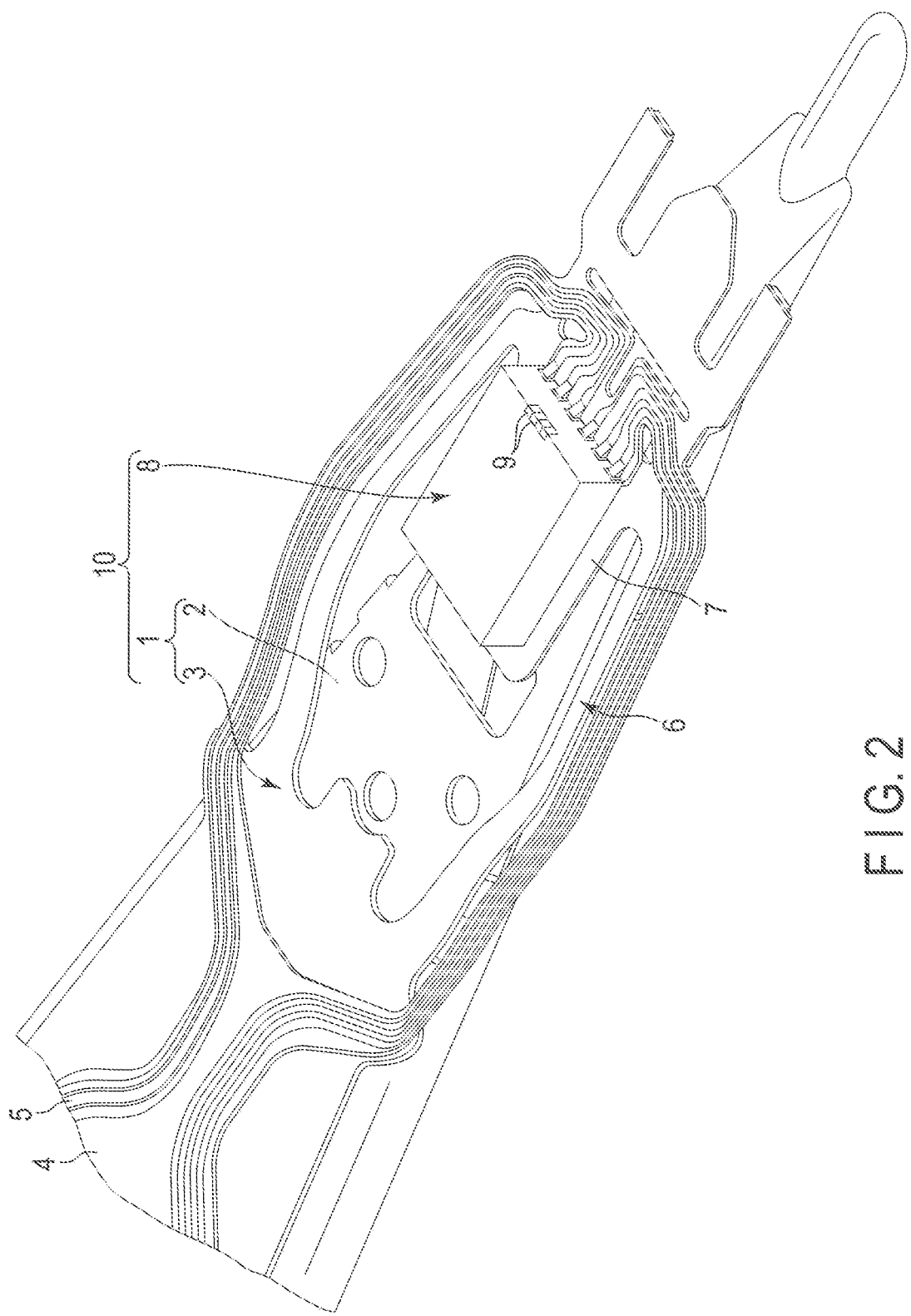
FIG. 2 is a perspective view showing an example of a suspension to be restored by the present embodiment.

One embodiment of the present invention relates to a suspension restoration method of restoring a suspension 1 by detaching only a magnetic head 9 from a head gimbal assembly 10. FIG. 1 is an illustration showing an example of a process included in the suspension restoration method of one embodiment. The present embodiment includes a detachment step S1 of detaching a slider 8 from a tongue portion 7 of the head gimbal assembly 10, and a removal step S2 of removing an adhesive remaining on the tongue portion 7 after the detachment step S1.

The removal step S2 of the present embodiment is characterized by including a first inspection step S21 of measuring the thickness of the adhesive and specifying a first residual area 24, a first irradiation step S22 of irradiating only a first irradiation area 34, which is slightly larger than the first residual area 24, locally with a first laser beam, and a second irradiation step S23 of irradiating not only the first irradiation area 34 but also a whole of a cleaning area 21 with a second laser beam. According to the present embodiment, the adhesive of the first residual area 24 can be efficiently removed, and the adhesive can be removed completely from the cleaning area 21.

In the following, the suspension restoration method of one embodiment will be explained in detail with reference to FIGS. 1 to 6.

FIG. 2 is a perspective view showing an example of the suspension 1 to be restored by the present embodiment. A hard disk drive (HDD) comprises a magnetic disk rotatable about a spindle, and a carriage turnable about a pivot. An arm of the carriage is provided with the suspension 1 Shown in FIG. 2.

The suspension 1 comprises a baseplate secured to the arm, a load beam 2 which can be deformed resiliently, and a flexure 3 with conductive lines disposed to overlap the load beam 2. The flexure 3 with conductive lines comprises a metal base 4 formed of a thin stainless steel plate, for example, and conductive lines 5 formed on the metal base 4.

In the proximity of a distal end of the flexure 3 with conductive lines, a gimbal portion 6 is formed. On the tongue portion 7 at the center of the gimbal portion 6, the slider 8 of a substantially rectangular shape is mounted via an adhesive. As the adhesive for fixing the slider 8, an epoxy adhesive, a phenolic adhesive, or an urethane-based adhesive, for example, can be used.

The magnetic head 9 formed on the slider 8 reads data from a recording surface of the magnetic disk, and also writes data on the recording surface. The slider 8 on which the magnetic head 9 is formed, and the suspension 1 elastically supporting the slider 8 constitute the head gimbal assembly (HGA) 10.

Figure 3:
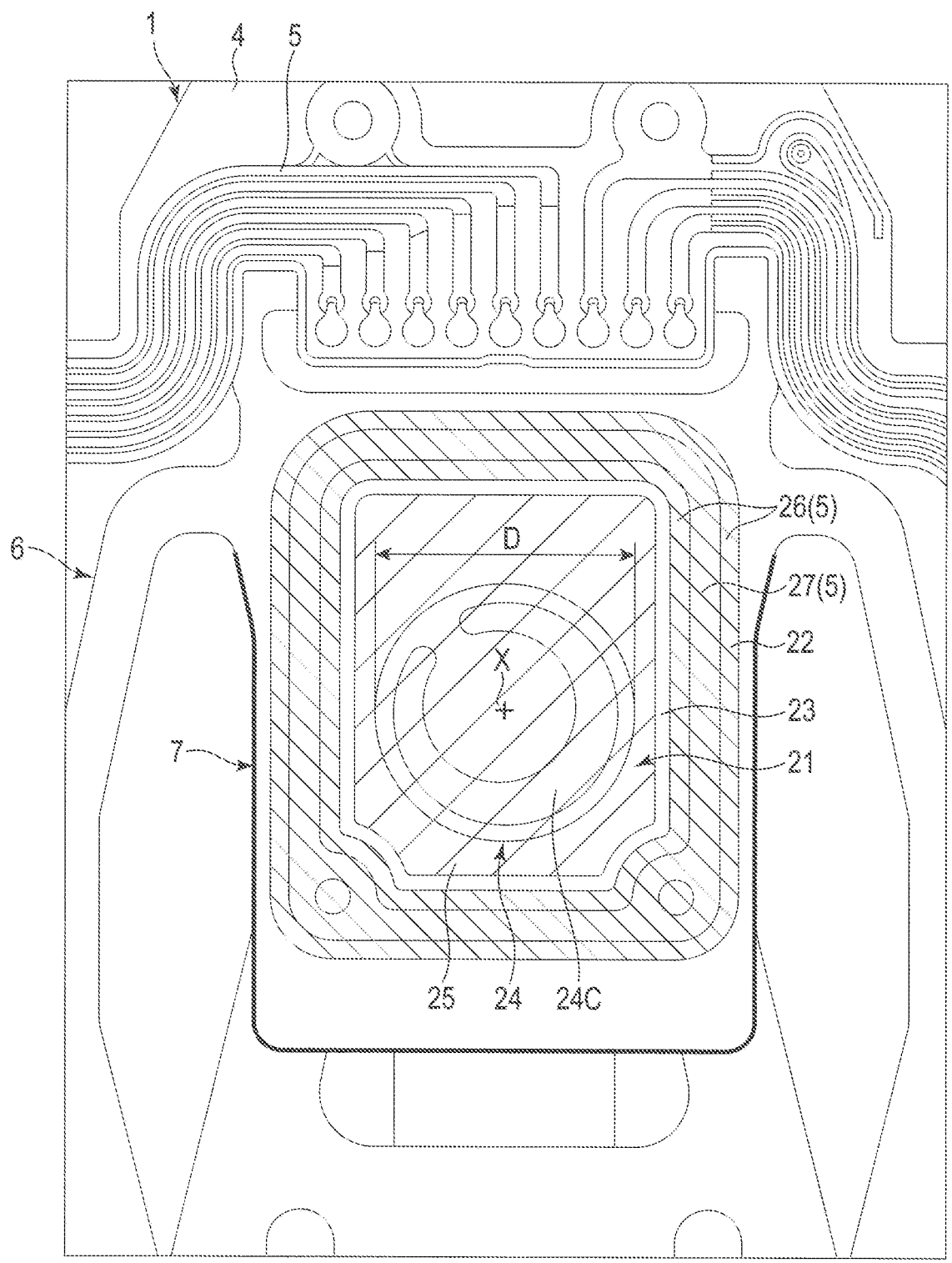
FIG. 3 is a plan view showing an example of a tongue portion from which a slider is detached through a detachment step.

FIG. 3 is a plan view showing an example of the tongue portion 7 from which the slider 8 is detached by the detachment step S1. The tongue portion 7 which has undergone the detachment step S1 includes the cleaning area 21, which is an area including the remaining adhesive and the vicinity thereof, a conductive line area 22 surrounding the cleaning area 21, and a non-irradiation area 23 formed between the cleaning area 21 and the conductive line area 22.

In FIG. 3, the cleaning area 21 is indicated by upward-sloping hatch lines, and the conductive line area 22 is indicated by downward-sloping hatch lines. For example, the cleaning area 21 is an area irradiated with a laser beam in the first and second irradiation steps S22 and S23. The non-irradiation area 23 is an area not irradiated with a laser beam intentionally for protecting the conductive line 5 formed in the conductive line area 22 the first and second irradiation steps S22 and S23. The non-irradiation area 23 is formed in an annular shape having a width of approximately 50 μm, for example.

The cleaning area 21 includes a first residual area 24 in which the thickness of the remaining adhesive exceeds a threshold value to be described later, and a second residual area 25 in which the thickness of the remaining adhesive is less than or equal to the threshold value to be described later. The first residual area 24 is defined by a trace of the adhesive dropped from a dispenser that is spread by the slider 8, and is formed in a substantially circular shape, for example.

Note that the first residual area 24 may include an irregularity area 24C in which the thickness of the adhesive is less than or equal to the threshold value locally due to the irregularities of the tongue portion 7 or air bubbles, etc., at an interior side of the rim of the substantially circular shape. The second residual area 25 surrounds the periphery of the first residual area 24, for example. Since the adhesive from the first residual area 24 may be adhering to the second residual area 25, laser beam irradiation is performed as a precaution in the second irradiation step S23.

In the conductive line area 22, a part of the conductive lines 5 is formed. The conductive line 5 comprises a base layer 26 formed on the metal base 4, a conductive layer 27 formed on the base layer 26, and a cover layer formed on the conductive layer 27. The cover layer is omitted from illustration in the conductive line 5 shown in FIG. 3. The base layer 26 and the cover layer can be formed of an insulating material such as polyimide resin. The conductive layer 27 can be formed of a metal material such as copper or aluminum.

Figure 4:
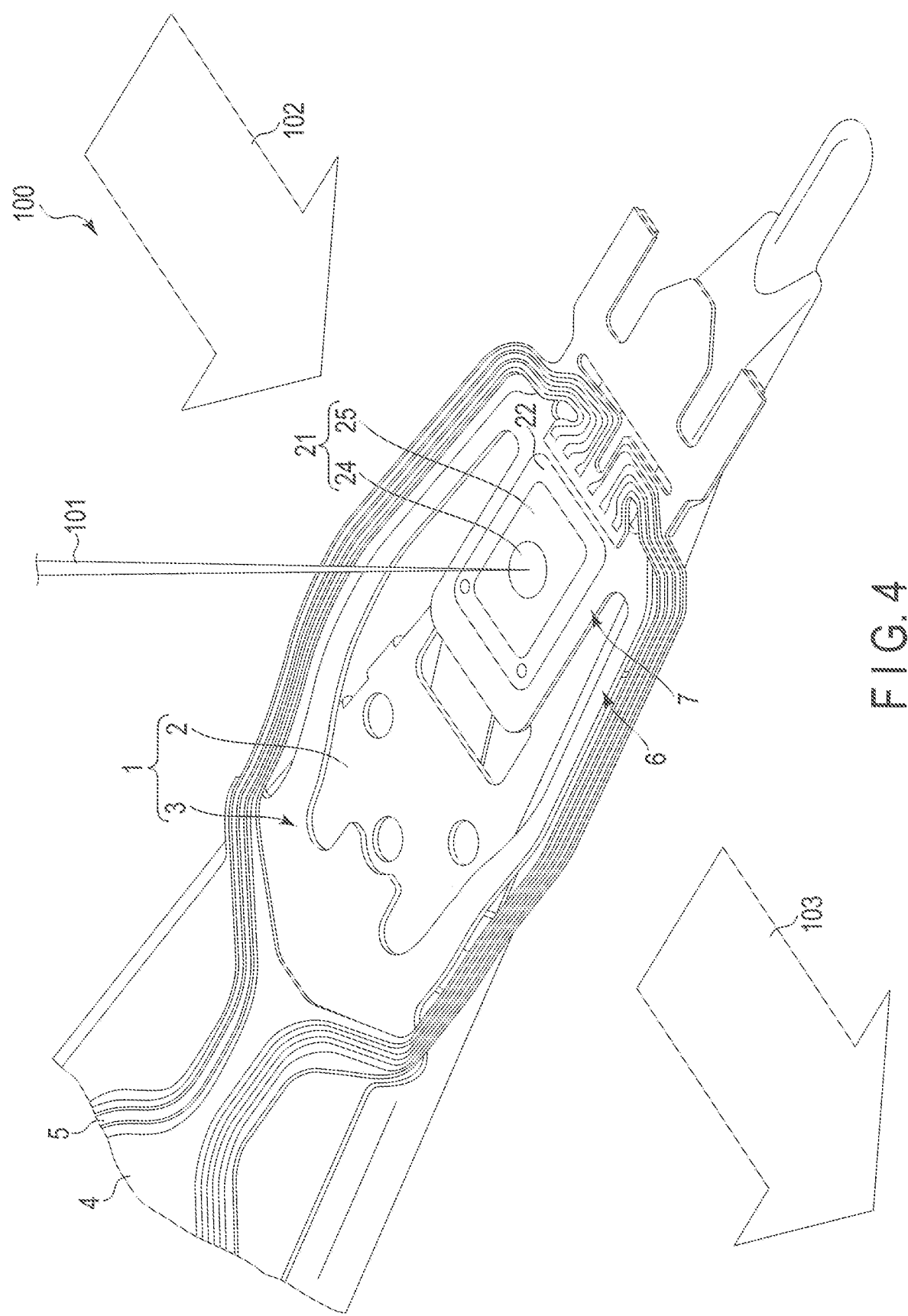
FIG. 4 is a perspective view showing an example of a cleaning apparatus used in a removal step.

FIG. 4 is a perspective view showing an example of a cleaning apparatus 100 used in the removal step S2. As shown in FIG. 4, the cleaning apparatus 100 comprises a laser device 101, an air blow device 102, and an air vacuum device 103. Further, the cleaning apparatus 100 includes a controller which controls the laser device 101, the air blow device 102, and the air vacuum device 103. Each of the operations included in the removal step S2 is executed under the control of the above controller, for example.

The laser device 101 has a measuring function of measuring the thickness of the adhesive remaining on the tongue portion 7 of the suspension 1, an identifying function of specifying the first residual area 24 based on the thickness of the measured adhesive, and an irradiating function of irradiating the adhesive with the laser beam. Note that a device having the measuring function or the identifying function may be provided separately from the laser device 101.

The laser beam to be applied from the laser device 101 is, for example, deep UV (ultraviolet) rays with wavelengths of 250 to 350 nm. When the deep UV rays are applied, a molecular chain is cut and the adhesive is dissolved. In contrast, given that irradiation with a green laser of a visible range (having a wavelength of 532 nm), or a carbon dioxide gas ($CO_2$) laser of an infrared region (having a wavelength of 9.4 μm or 10.6 μm) is performed, the temperature of the adhesive, which is an object to be processed, is raised, and the adhesive may be burned on the tongue portion 7.

As the deep UV rays which are to be applied from the laser device 101, deep UV rays, which are the fourth harmonic emitted from a YAG laser and having a wavelength of 266 nm, for example, can be used. Note that a light source which emits the deep UV rays is not limited to the YAG laser, and may be a deep UV LED, etc. The laser device 101 can refract a laser beam by, for example, a built-in optical system, and freely scan the tongue portion 7. Alternatively, the laser beam may be fixed and the tongue portion 7 can be scanned with the laser beam by moving the suspension 1 by an XY stage.

The laser device 101 measures the thickness of the remaining adhesive, and specifies the first residual area 24 in which the thickness of the adhesive exceeds the threshold value. As a method for measuring the thickness of the adhesive, various methods that are well-known may be adopted. Further, by approximating the first residual area 24 to a circular shape, a center X of a circle shown in FIG. 3, and a diameter of the circle are specified (calculated). The threshold value for discriminating between the first residual area 24 and the second residual area 25 can be set with reference to the thickness of the adhesive that can be fully removed within a scan time of the second irradiation step S23.

The air blow device 102 and the air vacuum device 103 are provided on the laser device 101, for example. The air blow device 102 blows away the adhesive of the tongue portion 7 dissolved by the deep UV rays applied from the laser device 101. The air vacuum device 103 sucks in the adhesive blown away by the air blow device 102. Note that the air blow device 102 and the air vacuum device 103 are not essential structures. Of the air blow device 102 and the air vacuum device 103, one of them may be omitted, or both of them may be omitted.

Referring to FIG. 1 again, a method of restoring the suspension according to the present embodiment will be described. The present embodiment includes the detachment step S1 and the removal step S2. In the detachment step S1, the slider 8 is detached from the head gimbal assembly 10. In the case of detaching the slider 8, the slider 8 is separated after weakening the adhesive power of the adhesive by heating the head gimbal assembly 10, for example.

The removal step S2 includes at least the first inspection step S21, the first irradiation step S22, and the second irradiation step S23. In the example illustrated in FIG. 1, the removal step S2 further irradiation step S25. Note that one of the second inspection step S24 and the third irradiation step S25 may be omitted, or both of them may be omitted.

In the first inspection step S21, the thickness of the adhesive remaining in the cleaning area 21 is measured by the above-mentioned measuring function, and the first residual area 24 in which the thickness of the adhesive exceeds the threshold value is specified. Further, an outer edge of the first residual area 24 is approximated to a circular shape, and as shown in FIG. 3, the center X and the diameter D of the circle are specified.

An example of the means for specifying the first residual area 24 is determination by image processing executed by the controller. In this image processing, the thickness of the remaining adhesive is binarized, in other words, is represented by either a value exceeding the threshold value or a value less than or equal to the threshold value. Further, the cleaning area 21 is colored differently using a first color and a second color in accordance with the binarized thickness of the adhesive. The number of areas of the first color may be one or more. Next, circles including all of the areas of the first color exceeding the threshold, which are circumscribed around the areas of the first color are drawn. Of the circumscribed circles that can be drawn, the smallest circle is determined as the first residual area 24, and the center and the diameter of this circle are determined as the center X and the diameter D. Note that an area of the second color included in this circle is the irregularity area 24C.

Figure 5:
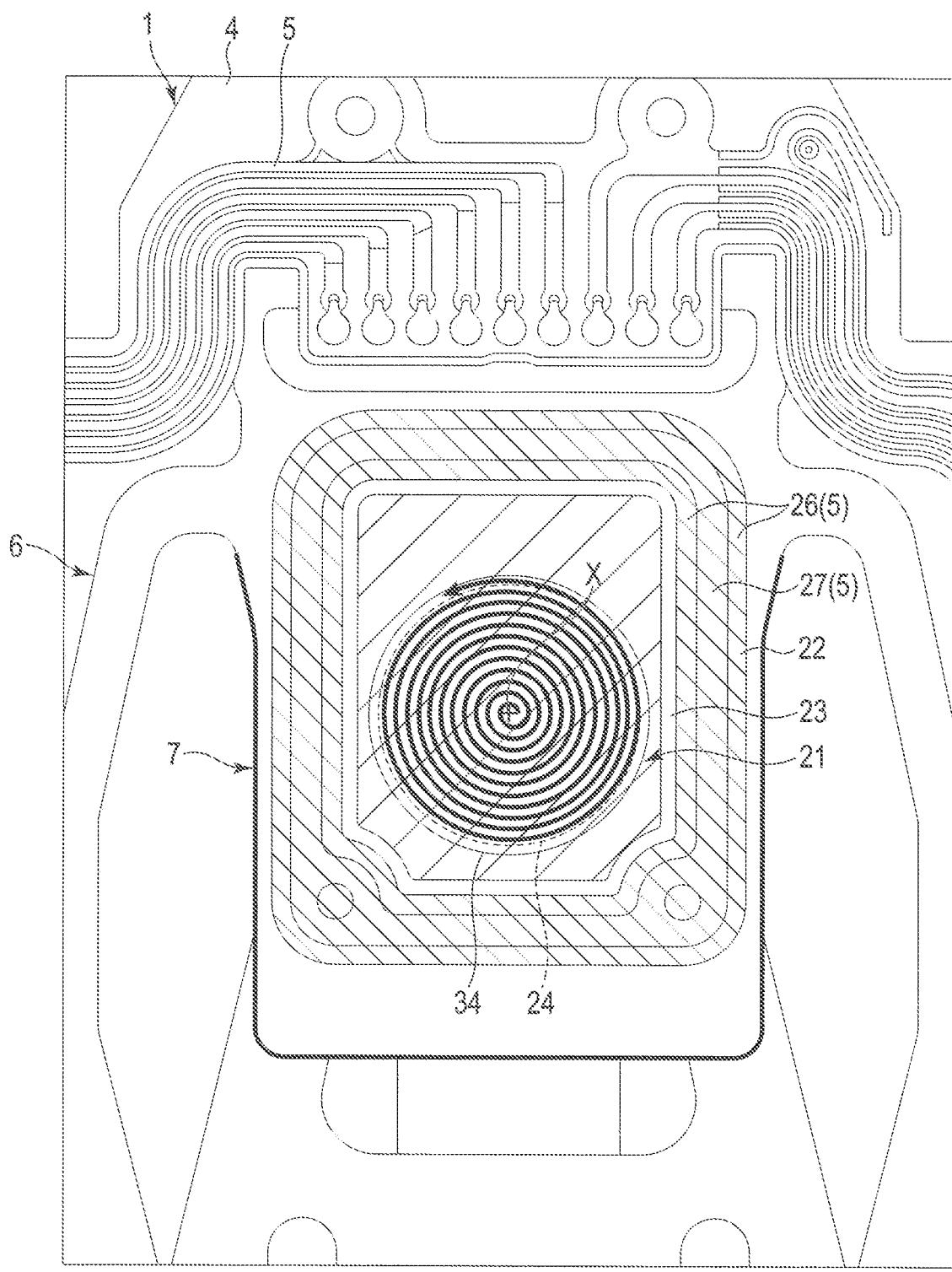
FIG. 5 is a plan view for explaining a first irradiation step shown in FIG. 1.

In the first irradiation step S22, the laser device 101 irradiates only the first irradiation area 34 locally with the laser beam (first laser beam). For example, the first irradiation area 34 can be set to a circle including the first residual area 24, as shown in FIG. 5. More specifically, the first irradiation area 34 is set to be the same as the first residual area 24, or a concentric circle which is slightly larger than the first residual area 24.

In one example, the first irradiation area 34 can be set to a concentric circle whose diameter is greater than that or the first residual area 24 by 0 to 5 μm. As another example, the first irradiation area 34 can be set to a concentric circle whose diameter is greater than that of the first residual area 24 by 0 to 10%. Since the first irradiation area 34 substantially overlaps the first residual area 24, these two may be assumed as the same. In the first irradiation step S22, the laser beam irradiation is performed in such a way that the first irradiation area 34 is filled in from the center X of the first irradiation area 34 (first residual area 24) spirally, for example.

Figure 6:
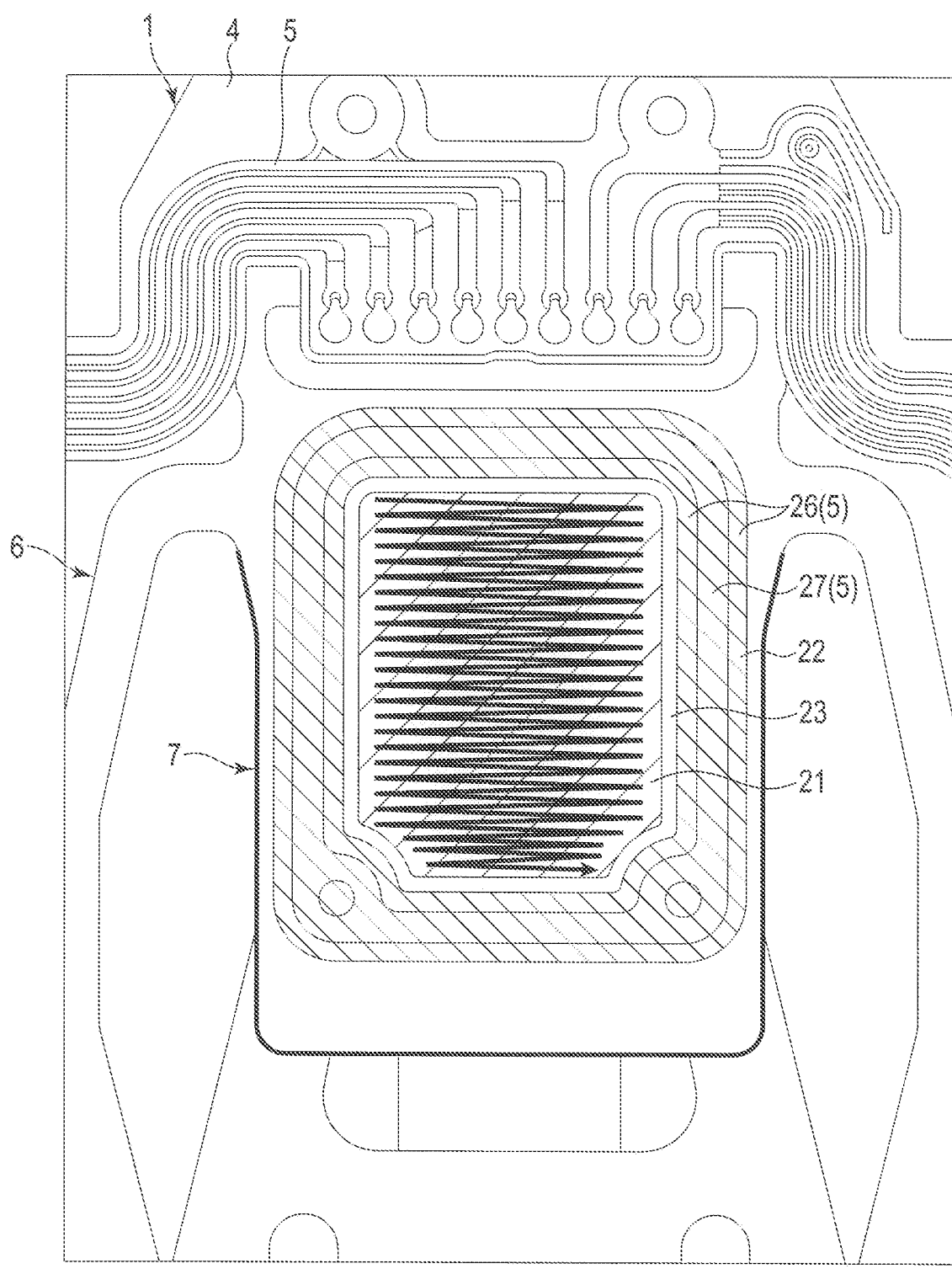
FIG. 6 is a plan view for explaining a second irradiation step shown in FIG. 1.

In the second irradiation step S23, as shown in FIG. 6, the laser device 101 irradiates the cleaning area 21 entirely with the laser beam (second laser beam). In the second irradiation step S23, the laser beam irradiation is performed in zigzags in such a way that the cleaning area 21 is filled in at an interior side of the non-irradiation area 23, for example.

In the second inspection step S24, the thickness of the adhesive in the cleaning area 21 is measured again by the above-mentioned measuring function, and whether or not the adhesive remains in the cleaning area 21 is detected. If the adhesive of the cleaning area 21 is completely removed (OK in S24), the removal step S2 is finished, and the suspension 1 is reused as a restored product.

If the adhesive of the cleaning area 21 is not removed and still remains in the cleaning area 21 (NG [not good] in S24), the third irradiation step S25 is carried out. In the third irradiation step S25, the laser device 101 irradiates the cleaning area 21 again with the laser beam (third laser beam). Alternatively, as another example, the removal step S2 may be finished without performing the third irradiation step S25, and the suspension 1 can be discarded as being an unrestored product.

In the third irradiation step S25, likewise the second irradiation step S23, for example, the cleaning area 21 is entirely irradiated with the laser beam. The suspension 1 for which the third irradiation step S25 has been performed is inspected again whether it is a restored product or an unrestored product by the second inspection step S24.

In the suspension restoration method of the present embodiment structured as described above, the removal step S2 of removing the adhesive remaining on the tongue portion 7 after the detachment step S1 includes the first inspection step S21, the first irradiation step S22, and the second irradiation step S23. In the second irradiation step S23, the cleaning area 21 is entirely irradiated with the laser beam. In the first irradiation step S22, the laser beam is applied mainly to the first residual area 24 in which the adhesive cannot be completely removed by the second irradiation step S23. In the first inspection step S21, a range of the first residual area 24 is specified by setting the thickness of the adhesive, which can be sufficiently removed by the second irradiation step S23, to the threshold value.

According to the present embodiment, the adhesive of the first residual area 24 can be removed thoroughly by the first irradiation step S22, and a slight amount of adhesive which may have adhered to the periphery of the first residual area 24 can also be surely removed by the second irradiation step S23 of the finishing. Since the number of executions of the laser beam irradiation is changed according to the thickness of the adhesive, in the second irradiation step of irradiating the cleaning area 21 entirely with the laser beam, irradiation time of the laser beam does not need to be extended in accordance with the thickness of the adhesive of the first residual area 24.

Since the adhesive is removed by the laser beam without contacting the suspension 1, there is no risk of deforming the suspension 1 that is delicate by application of an external force. Accordingly, the suspension 1 can be restored by removing the adhesive without damaging the suspension 1. Further, since the restoration of the suspension 1 can be automated, working time can be reduced. Furthermore, since an organic solvent is not used, an environmental burden is small, and the health of the operator is not impaired.

Since the adhesive dropped from the dispenser is spread out circularly, the first residual area 24 in which the adhesive is thick is formed in a substantially circular shape. The restoration method according to the present embodiment includes the first inspection step S21 of approximating the first residual area 24 to a circular shape, and specifying the center X and the diameter D. According to the present embodiment as described above, a position and a size of an irradiation range of the laser beam, which is to be applied in the first irradiation step S22, can be optimized on the basis of the measurement result of the first inspection step S21. If the means for specifying the first residual area 24 is computation processing D of the first residual area 24 can be specified accurately, and the position accuracy of the laser beam can be improved.

In the first irradiation step S22 of the present embodiment, since the laser beam is applied spirally in such a way as to fill in the area to be irradiated, the adhesive remaining in the circular first residual area 24 can be reliably removed. In the second irradiation step S23, since the laser beam is applied in zigzags in such a way as to fill in the area to be irradiated, the adhesive remaining in the rectangular cleaning area 21 can be reliably removed.

In the present embodiment, the tongue portion 7 comprises the non-irradiation area 23 formed between the cleaning area 21 and the conductive line area 22. By this structure, since the conductive line area 22 is not directly adjacent to the cleaning area 22, it is possible to prevent the conductive lines 5 from being damaged by the laser beams.

In the restoration method according to the present embodiment, the removal step S2 further includes the second inspection step S24, and thus, whether the suspension 1 is a restored product or an unrestored product can be determined automatically. Therefore, a burden on the operator can be reduced, and an unrestored product is not overlooked by a human error. Moreover, in the second inspection step S24, by using the measuring function similar to that used in the first inspection step S21, whether the suspension 1 is a restored product or an unrestored product can be determined automatically. Accordingly, additional investment in plant and equipment for carrying out the second inspection step S24 is not required.

In the restoration method according to the present third irradiation step S25, and thus, the suspension 1, which is determined as being the unrestored product in the second inspection step S24, can be irradiated with the laser beam again. If the setting is made so that the second inspection step S24 and the third irradiation step S25 are repeated, the laser device 101 can be made to perform automatic operation until the suspension 1 is renewed as a restored product.

That is, even if the thickness of the adhesive remaining on the tongue portion 7 is nonuniform, the number of executions of the laser beam irradiation can be optimized in accordance with the individual difference between the suspensions 1. By this feature, there is no need to set the time for irradiating all of the suspensions 1 long in line with a certain suspension 1 having a thick adhesive.

In the restoration method according to the present embodiment, as the laser beam, deep UV rays with wavelengths of 250 to 350 nm, for example, are used. Given that a laser of a visible range or an infrared region is applied, the temperature of the adhesive, which is an object to be processed, is raised, and the adhesive may be burned on the tongue portion 7. In contrast, if the deep UV rays with the wavelengths of 250 to 350 nm are used, the adhesive can be dissolved as the molecular chain is cut while suppressing a rise in temperature.

Since the laser device 101 according to the present embodiment is provided with the air blow device 102 which blows away the adhesive dissolved by the deep UV rays, and the air vacuum device 103 which sucks in the blown away adhesive, the dissolved adhesive can be automatically removed. Further, readherence of the adhesive can be prevented.

Additional advantages and modifications will readily occur to those skilled in the art. Therefore, the invention in its broader aspects is not limited to the specific details and representative embodiments shows and described herein. Accordingly, various modifications may be made without departing from the spirit or scope of the general inventive concept as defined by the appended claims and their equivalents.

For example, instead of separating the cleaning area 21 into two areas of the first residual area 24 and the other area, the cleaning area 21 may be separated into three areas or more by setting a plurality of threshold values. In that case, by changing the irradiation time and the number of executions of the laser beam in accordance with the respective areas, the adhesive can be removed efficiently.

What is claimed is:

1. A method of restoring a suspension, the method comprising:
   detaching a slider, which is mounted on a tongue portion of the suspension of a hard disk drive via an adhesive, from the suspension;
   measuring a thickness of the adhesive in a cleaning area of the tongue portion;
   specifying a first residual area in which the thickness of the adhesive exceeds a threshold value;
   irradiating a first irradiation area including the first residual area locally with a first laser beam; and
   irradiating the cleaning area entirely with a second laser beam,
   wherein:
   the specifying the first residual area includes approximating the first residual area to a circle, and specifying a center and a diameter of the first residual area,
   the first irradiation area is a concentric circle slightly larger than the first residual area, and
   the first laser beam is applied in such a way as to fill in the first irradiation area.

2. The method of claim 1, wherein the first laser beam is applied spirally.

3. The method of claim 1, further comprising detecting whether the adhesive still remains in the cleaning area after the second laser beam irradiation.

4. The method of claim 1, wherein one of the first laser beam and the second laser beam is a deep UV ray with a wavelength of 250 to 350 nm.

5. The method of claim 1, further comprising:
   blowing away the adhesive dissolved by deep UV rays by an air blow device; and
   sucking in the blown away adhesive by an air vacuum device.

6. A method of restoring a suspension, the method comprising:
   detaching a slider, which is mounted on a tongue portion of the suspension of a hard disk drive via an adhesive, from the suspension;
   measuring a thickness of the adhesive in a cleaning area of the tongue portion;
   specifying a first residual area in which the thickness of the adhesive exceeds a threshold value;
   irradiating a first irradiation area including the first residual area locally with a first laser beam; and
   irradiating the cleaning area entirely with a second laser beam,
   wherein:
   the tongue portion further includes a conductive line area surrounding the cleaning area, and a non-irradiation area formed between the cleaning area and the conductive line area, and
   the second laser beam is applied in such a way as to fill in the cleaning area at an interior side of the non-irradiation area.

7. The method of claim 6, wherein the second laser beam is applied in zigzags.

8. The method of claim 6, further comprising detecting whether the adhesive still remains in the cleaning area after the second laser beam irradiation.

9. The method of claim 6, wherein one of the first laser beam and the second laser beam is a deep UV ray with a wavelength of 250 to 350 nm.

10. The method of claim 6, further comprising:
blowing away the adhesive dissolved by deep UV rays by an air blow device; and
sucking in the blown away adhesive by an air vacuum device.

* * * * *